US008341617B2

(12) United States Patent
Bunn

(10) Patent No.: US 8,341,617 B2
(45) Date of Patent: Dec. 25, 2012

(54) SCHEDULING SOFTWARE UPDATES

(75) Inventor: Neil L. Bunn, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 11/951,369

(22) Filed: Dec. 6, 2007

(65) Prior Publication Data
US 2008/0201702 A1 Aug. 21, 2008

(30) Foreign Application Priority Data

Feb. 21, 2007 (CA) ..................................... 2579266

(51) Int. Cl.
*G06F 9/445* (2006.01)
*G06F 9/00* (2006.01)
*G06F 17/50* (2006.01)

(52) U.S. Cl. ........ 717/168; 717/176; 717/171; 717/174; 718/100; 718/101; 718/102; 718/103; 714/2; 714/15; 714/19; 714/20

(58) Field of Classification Search .................. 717/176, 717/168–173; 714/2–20; 718/100–103
See application file for complete search history.

(56) References Cited

U.S. PATENT DOCUMENTS

| 5,655,074 | A | * | 8/1997 | Rauscher | 714/38.1 |
| 6,813,760 | B1 | * | 11/2004 | Fitzel et al. | 717/131 |
| 2003/0187967 | A1 | * | 10/2003 | Walsh et al. | 709/223 |
| 2004/0255296 | A1 | * | 12/2004 | Schmidt et al. | 718/100 |
| 2005/0240633 | A1 | * | 10/2005 | Krishnaswamy et al. | 707/200 |
| 2006/0004756 | A1 | * | 1/2006 | Peleg et al. | 707/8 |
| 2006/0080656 | A1 | * | 4/2006 | Cain et al. | 717/174 |
| 2007/0010983 | A1 | * | 1/2007 | Bauer et al. | 703/17 |

* cited by examiner

*Primary Examiner* — Jason Mitchell
*Assistant Examiner* — Keith C Yuen
(74) *Attorney, Agent, or Firm* — Andrea Bauer; Hoffman Warnick LLC

(57) ABSTRACT

A system and method for scheduling software updates on data processing systems. In an embodiment, software updates are scheduled on a data processing system by identifying a list of software updates; scheduling at least one primary software update for execution within a scheduled outage time based on an estimated execution time and an estimated rollback time for the at least one primary software update; executing the at least one primary software update during the scheduled outage time; and ordering the list of software updates for possible execution of at least one secondary software update in any remaining outage time in dependence upon the estimated execution times and estimated rollback times for each of the remaining software updates. The list of software updates may also be ordered in further dependence upon evaluation of relative priorities between the software updates, any prerequisite software updates, and a performance scaling factor for the data processing system.

15 Claims, 7 Drawing Sheets

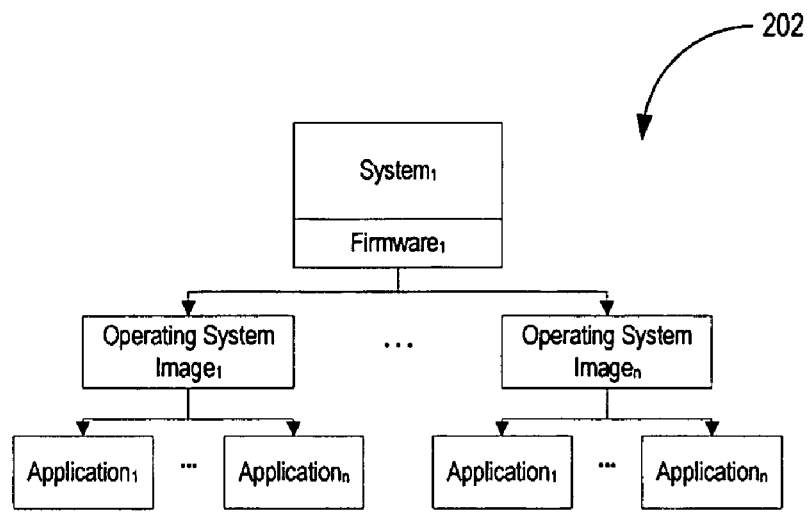
- Virtualization is pervasive. (eg. POWER Hypervisor, VMWare, HP IVM)
- Multiple OS images on each physical hardware device
- Physical hardware still requires master hardware code (BIOS, firmware, etc.)
- Applications are sometimes clustered across systems
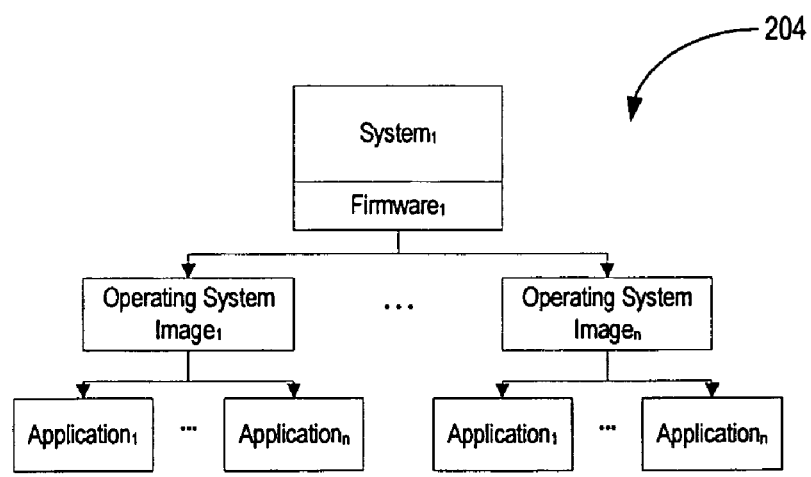
FIG. 2

```xml
<patch id="fw_117" category="firmware">                    #patch and release details
    <title>Firmware Release SF240_138</title>              #title for patch
    <author><email>support@ibm.com</email></author>        #author
    <date><release>Wed, 14 Jun 2006</release><timing_update>Thur, 22 Oct 2006</timing_update></date>  #date of release, and updates date
    <description>                                          #general patch description
        Firmware Release SF240_138
        Updates to power management code.
        Bug fix for stack overflow due to invalid code at location BF0888.
        Enhanced threading performance algorithm.
    </description>
    <requirements>
        <prerequisite><release>fw_110</release><category>firmware</category></prerequisite>    #prerequisite minimum levels
        <supercede><release>fw_116</release><category>firmware</category></supercede>          #replaces/supersede levels
        <prerequisite><release>os_5302</release><category>operating system</category></prerequisite>
    </requirements>
    <timings>
        <test_time>1.2H</test_time>                        #timing based on lab test installs (expert knowledge)
        <rollback_time>2.2H</rollback_time>                #expected rollback time based on test failures (expert knowledge)
        <relative_perf>4.7</relative_perf>                 #relative machine performance for test timing
        <user_feedback_time>1.3H</user_feedback_time>      #timing based on field install tools feedback
    </timings>
    <impact>
        <disruptive>Yes</disruptive>
        <redundant_rollback>No</redundant_rollback>
    </impact>
    <priority>
        <security>0</security>                             #security priority, further fields could be used to provide details on the priority scale
        <reliability>8</reliability>                       #reliability priority
        <usability>0</usability>                           #usability priority
        <new_function>4</new_function>                     #new_function priority
    </priority>
    <related url="techsupport.services.ibm.com/servers/updates/firmware/sf240_138">SF240_138 Update</related>
</patch>
```

FIG. 5  ⟵ 500

SCHEDULING SOFTWARE UPDATES

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates to systems and methods for scheduling software updates on data processing systems, and particularly for data processing systems in complex information technology (IT) environments

BACKGROUND ART

Complex IT environments now have sophisticated server and application environments with multiple layers of influence on each other. This poses significant problems when scheduling software updates to the infrastructure, and vendors are often faced with questions from their customers such as: How long should I plan for this upgrade? How long with this repair take? How long would a rollback take in the event of failure?

IT managers are under intense pressure to ensure maximum systems availability, while maintaining strict audit compliance through regular software updates and updates to the data processing systems to maintain security and reliability. Unfortunately these two goals are often in conflict, as updating or upgrading typically results in significant service interruption.

Additionally, any changes made to production systems are high risk and must be carefully planned with sufficient time for problem resolution in the event that the software updates do not execute as planned. This often leads to significant over-provisioning of outage windows for the software updates, resulting in reduced systems availability.

SUMMARY OF THE INVENTION

The present invention relates to a system and method for scheduling software updates on data processing systems, particularly those in complex IT environments.

In an aspect of the invention, there is provided a method of scheduling software updates on a data processing system, comprising: identifying a list of software updates; scheduling at least one primary software update for execution within a scheduled outage time based on an estimated execution time and an estimated rollback time for the at least one primary software update; executing the at least one primary software update during the scheduled outage time; and ordering the list of software updates for possible execution of at least one secondary software update in any remaining outage time in dependence upon the estimated execution times and estimated rollback times for each of the remaining software updates.

In an embodiment, the method further comprises ordering the list of software updates in dependence upon evaluation of relative priorities between the software updates, and any prerequisite software updates.

In another embodiment, the method further comprises adjusting the estimated execution times and rollback times with an estimated performance scaling factor in dependence upon the type of data processing system.

In another embodiment, the method further comprises recording metrics for executing the software updates and storing the metrics in a knowledge base, the recorded metrics including at least one of actual execution time, actual rollback time, and configuration information for the type of data processing system on which the software update was executed.

In another embodiment, the method further comprises: evaluating the metrics stored in the knowledge base; and in dependence upon the evaluation, updating at least one of the estimated execution time, rollback time, and performance scaling factor for subsequent evaluation and ordering of the software updates.

In another aspect, there is provided a system for scheduling software updates on a data processing system, comprising: means for identifying a list of software updates; means for scheduling at least one primary software update for execution within a scheduled outage time based on an estimated execution time and an estimated rollback time for the at least one primary software update; means for executing the at least one primary software update during the scheduled outage time; and means for ordering the list of software updates for possible execution of at least one secondary software update in any remaining outage time in dependence upon the estimated execution times and estimated rollback times for each of the remaining software updates.

In an embodiment, the system further comprises means for ordering the list of software updates in dependence upon evaluation of relative priorities between the software updates, and any prerequisite software updates.

In another embodiment, the system further comprises means for adjusting the estimated execution times and rollback times with an estimated performance scaling factor in dependence upon the type of data processing system.

In another embodiment, the system further comprises means for recording metrics for executing the software updates and storing the metrics in a knowledge base, the recorded metrics including at least one of actual execution time, actual rollback time, and configuration information for the type of data processing system on which the software update was executed.

In another embodiment, the system further comprises means for evaluating the metrics stored in the knowledge base; and means for updating at least one of the estimated execution time, rollback time, and performance scaling factor in dependence upon the evaluation, for subsequent evaluation and ordering of the software updates.

In another aspect, there is provided a data processor readable medium storing data processor code that when loaded into data processing device adapts the device to schedule software updates, the data processor readable medium comprising: code for identifying a list of software updates; code for scheduling at least one primary software update for execution within a scheduled outage time based on an estimated execution time and an estimated rollback time for the at least one primary software update; code for executing the at least one primary software update during the scheduled outage time; and code for ordering the list of software updates for possible execution of at least one secondary software update in any remaining outage time, in dependence upon the estimated execution times and estimated rollback times for each of the remaining software updates.

In an embodiment, the data processor readable medium further comprising code for ordering the list of software updates in dependence upon evaluation of relative priorities between the software updates, and any prerequisite software updates.

In another embodiment, the data processor readable medium further comprises code for adjusting the estimated execution times and rollback times with an estimated performance scaling factor in dependence upon the type of data processing system. In another embodiment, the data processor readable medium further comprises code for recording metrics for executing the software updates and storing the metrics in a knowledge base, the recorded metrics including at least one of actual execution time, actual rollback time, and configuration information for the type of data processing system on which the software update was executed.

In another embodiment, the data processor readable medium further comprises code for evaluating the metrics stored in the knowledge base; and code for updating at least one of the estimated execution time, rollback time, and performance scaling factor in dependence upon the evaluation, for subsequent evaluation and ordering of the software updates.

These and other aspects of the invention will become apparent from the following more particular descriptions of exemplary embodiments.

BRIEF DESCRIPTION OF THE DRAWINGS

These and other features of this invention will be more readily understood from the following detailed description of the various aspects of the invention taken in conjunction with the accompanying drawings.

FIG. 2 shows a schematic block diagram of an illustrative complex IT environment.

FIG. 5 shows an illustrative example of XML metadata.

DETAILED DESCRIPTION OF THE INVENTION

As noted above, the present invention relates to a system and method for scheduling software updates on data processing systems, and particularly those data processing systems in complex IT environments.

Figure 1:
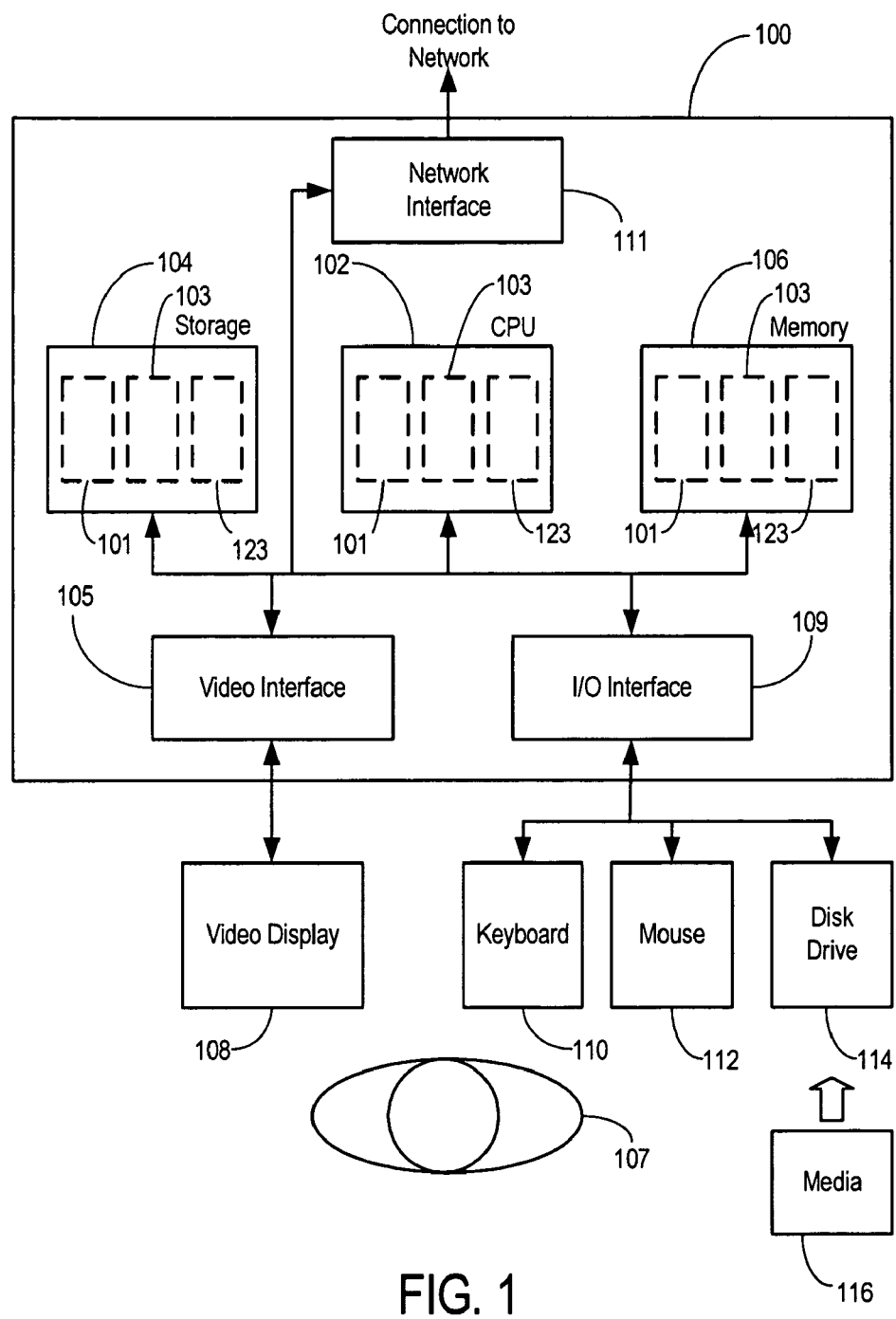
FIG. 1 shows a generic data processing system that may provide a suitable operating environment.

The invention may be practiced in various embodiments. A suitably configured data processing system, and associated communications networks, devices, software, and firmware may provide a platform for enabling one or more of these systems and methods. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Now referring to FIG. 2, shown is a schematic block diagram of an illustrative complex IT environment in which sophisticated applications 202, 204 running on one or more data processing systems 100 may have multiple layers of influence on each other. As noted earlier, this may pose significant problems when scheduling software updates to the IT infrastructure illustrated in FIG. 2.

Figure 3:
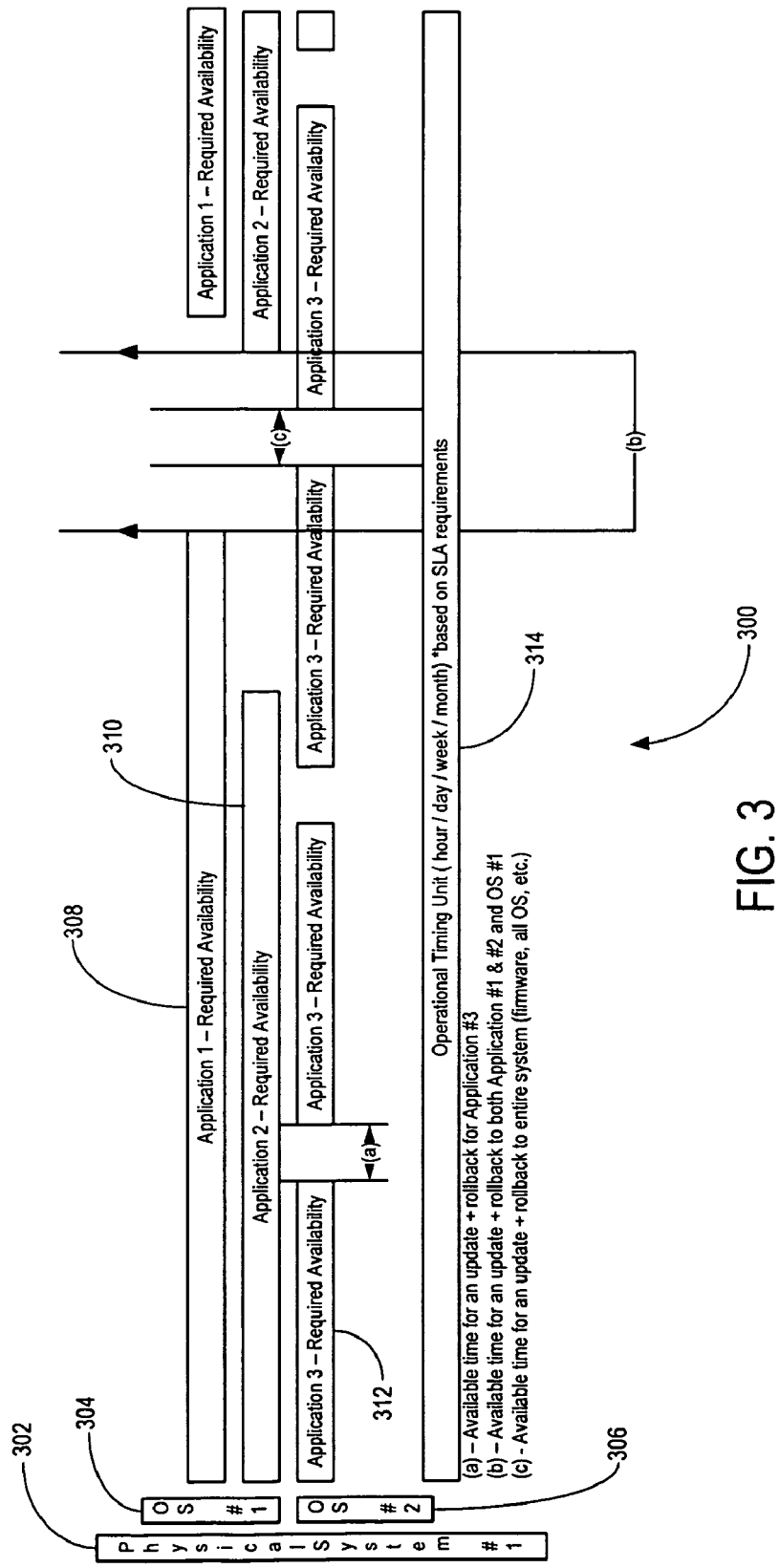
FIG. 3 shows a schematic block diagram of an illustrative software update schedule.

An illustrative example of a schedule 300 that may be applied in a complex IT environment is shown in FIG. 3, in which a physical system 302 may support operating system #1 304 and operating system #2 306. In this illustrative example, operating system #1 304 may be configured to run application #1 308 and application #2 310, while operating system #2 306 is configured to run application #3 312. As shown, each application 308, 310, 312 may have interdependencies and service level target (SLT) requirements 314 which stipulate when each application 308, 310, 312 must be available, and further stipulate available windows (a), (b), (c) in which the applications may be updated, or rolled back to a previous state.

As will be described in more detail, in order to schedule a software update or upgrade, the present system and method seeks answers to a number of key questions: a) Is the software update/upgrade required? b) How urgent is the software update/upgrade, and is it critical to THIS environment? c) How long will it take to apply the software update/upgrade? d) How long would it take to rollback out the software update/upgrade?

The above questions comprises some of the primary drivers of software update application and management regardless of whether the update or upgrade is an operating system (OS) update, a firmware update or another type of software update.

Figure 4A:
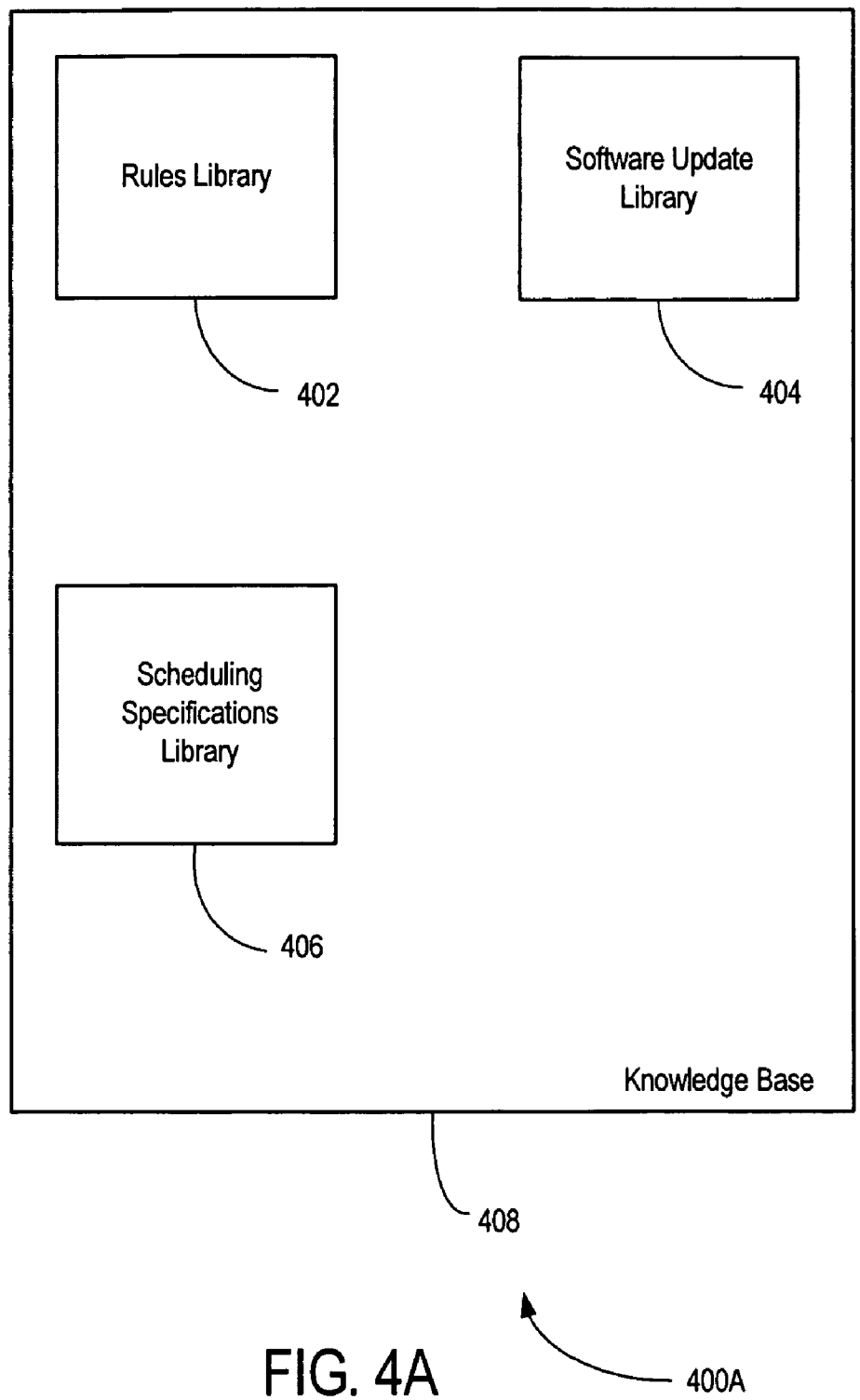
FIGS. 4A and 4B show schematic block diagrams of an illustrative system in accordance with an embodiment.
Figure 4B:
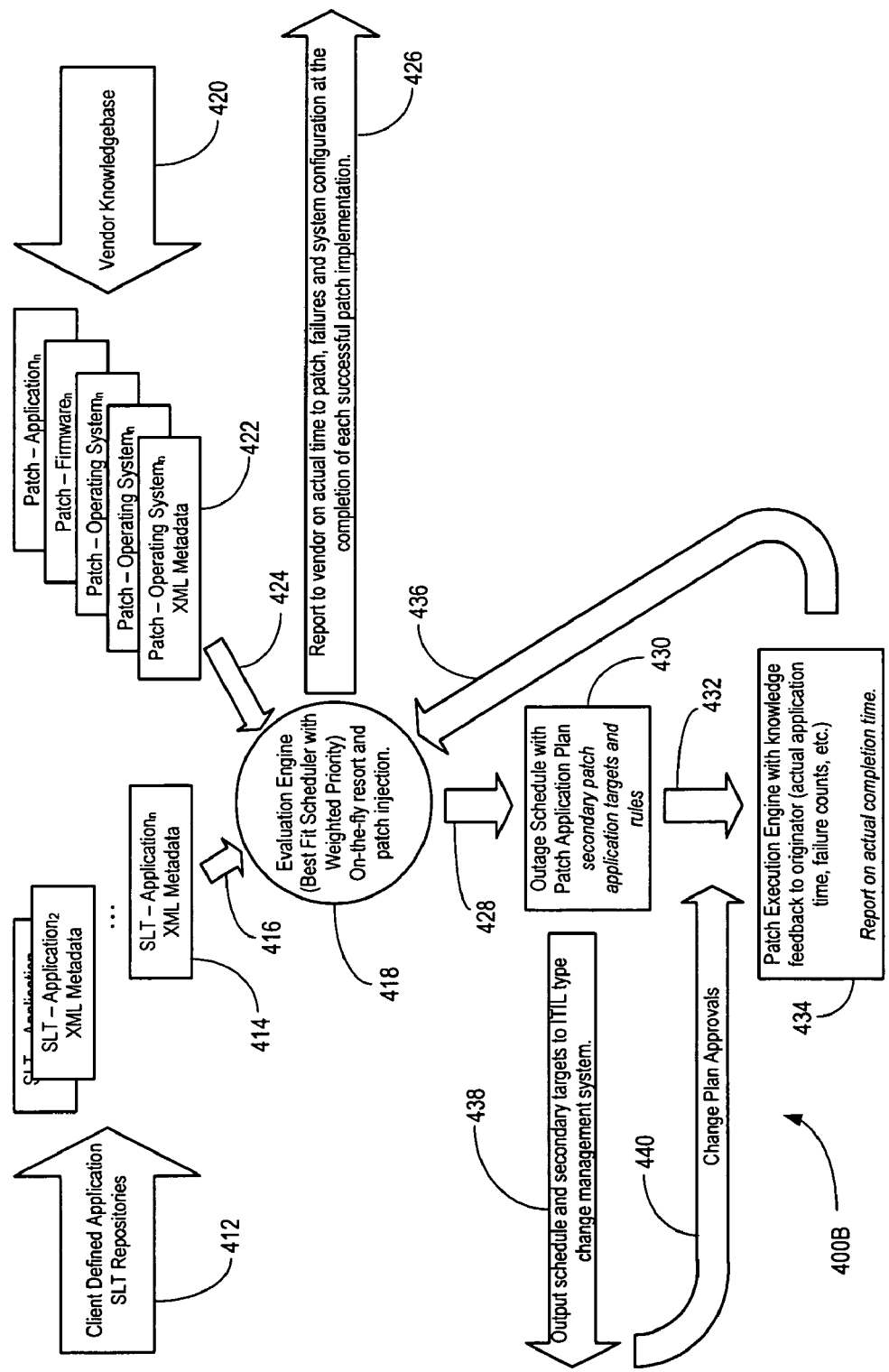

Now referring to FIGS. 4A and 4B, shown are schematic block diagrams 400A, 400B of an illustrative system 400 and corresponding method in accordance with an embodiment.

As shown in FIG. 4A, using a rules library 402, a software update library 404, and a scheduling specifications library 406, system 400 may develop a knowledge base 408 for schedule and executing software updates.

In an embodiment, the knowledge stored in the scheduling specifications library 406 may be gathered from various software update executions performed in a controlled testing environment, as well as metrics recorded in the field in different operating environments and different data processing system configurations. Such data may be identified, stored, accumulated and updated to form an ever-improving knowledge base 408. Based on the accumulated knowledge base 408, more precise estimates for the appropriate length of planned outages may be provided.

Furthermore, with a more comprehensive knowledge base 408, if a scheduled software update completes in less time than scheduled, a secondary software update may be inserted for updating within the remaining outage time, which would otherwise be unproductive down time. This will be described in more detail further below.

Now referring to FIG. 4B, system 400 may include a SLT repository 412 of client defined SLTs for their various installed applications. As an example, these SLTs may include detailed application infrastructure and documentation on the available maintenance windows for that application. In an embodiment, the repository 412 may contain a list of SLTs 414 for each one of applications 1 to n, which may be defined using extensible mark-up language (XML) metadata. As also shown, the SLTs 414 for each application 1 to n may be provided as an application SLT input 416 to an evaluation engine 418.

Still referring to FIG. 4B, system 400 may include a vendor knowledgebase 420 with information on the software updates 422 to be applied. For example, the software updates may relate to updates for OS, firmware, and applications. The information on the software updates 422 may be stored in a repository and defined using XML metadata, and may be provided as a software update input 424 to the evaluation engine 418.

In an embodiment, the evaluation engine 418 may be configured to evaluate a schedule for updating data processing systems using a best-fit scheduler which attempts to schedule the required software updates according to the best fit within the planned outage time. In an embodiment, adaptive best-fit scheduling may schedules available software updates by completing a number of steps, including:
(a) pre-requisite checking and validation;
(b) primary sorting based on vendor primary weighting with client customization;
(c) risk analysis based on rollback estimates;
(d) schedule estimation using:
  i) vendor test timing data (time to execute in lab environments)
  ii) external feedback data (knowledgebase feedback through client execution attempts)
  iii) Performance scaling based on relative performance data (i.e.: if the software update was tested on a system with x performance, and the target is a system with a 2× performance, the expected execution time may be scaled appropriately with a 2× performance scaling factor)
(e) outputting an estimated schedule for next available window including:
  i) guaranteed primary software update target (primary software update, fits inside window with calculated rollback risk)
  ii) secondary targets (lower priority software updates that may fit within the window depending on actual execution time for the primary target)
(f) as software updates are applied successfully, using a feedback loop to elevate secondary targets to primary targets for remaining available outage time, based on the actual remaining time after a primary software update plus rollback time if any, while still ensuring adequate safety factor per risk specifications.

In an embodiment, the software updates 422 can be configured with informative metadata which may be evaluated with an expert system. For example, the software updates 422 may include XML metadata containing detailed scheduling data based on past performance in controlled test software updates. Other data may include vendor estimated urgency/primary for the software update, prerequisites for the software update, and actual execution times recorded from end-user systems where the software update has already been applied. An illustrative example of such XML metadata is shown in FIG. 5.

In an embodiment, the metadata associated with any software update must contain enough information to be properly evaluated by the system 400. The metadata may include, for example:

(a) Unique update ID and category (category is required to ensure update IDs are differentiable between vendors, OS levels and application levels;
(b) Date of release of update, and date of any updates to the update metadata (e.g. primary updates may be based on the age of the update);
(c) Pre-requisite information, citing update IDs for any updates or software levels that must exist on the system prior to execution of any software updates, and/or information on any updates made redundant by a more current update (superseding);
(d) Timing data (if available) to provide risk and rollback guidance to the update evaluation system. Timings may include the lab-measured estimates for the execution of the update, and the timings for any automated rollback features in the event of failure. Timing data may also include user-experienced time, based on an accumulation of user-reported timings from actual executions in various machine types or scenarios;
(e) Primary details to aid the evaluation system in determining end-user primary levels. This data may specify or target security or reliability related updates as a higher primary than functional updates;
(f) Other fields of the metadata may provide contact information and feedback information for errors or additional details regarding the update, which would also be recorded for audit purposes.

In an embodiment, the evaluation engine 418 may be configured to provide dynamic ordering using a best-fit scheduler as described above. In an embodiment, dynamic ordering means that the system 400 may continually re-evaluate the next software update to be applied. For example, consider if the system 400 originally sorts and schedules primary software update no. 1 and another primary software update no. 2 to be installed within a scheduled outage time, with sufficient installation and rollback time scheduled for both. If the execution of primary software update no. 1 goes well, and rollback is not required, then it may be possible for system 400 to order the remaining list of required software updates for possible scheduling and execution of one or more secondary software updates in any remaining outage time after execution of software update no. 2.

For example, system 400 may evaluate both secondary software update no. 3 and software update no. 4 for possible scheduling for execution after software update no. 2. In an embodiment, system 400 may calculate the relative priorities as between software update no. 3 and software update no. 4, and also check to see if one or the other have prerequisite software updates that must be executed first. System 400 may also calculate the risk of successfully completing the execution of either software update no. 3 or software update no. 4 within the remaining outage time, before scheduling one or the other. For example, if software update no. 2 also executes without any problems, the availability of additional remaining outage time may cause system 400 to re-evaluate and reorder the scheduling of software update no. 3 and software update no. 4 after completion of execution of software update no. 2. The evaluation engine 418 may thus be configured to dynamically order and schedule the software updates to reduce the number of outstanding software updates as quickly as possible, while taking into account the relative priorities, prerequisites, and estimates for installation and rollback for each of the remaining software updates. The ordering and scheduling of these secondary update targets to use up any remaining outage time, if available, is explained in more detail further below.

Referring back to FIG. 4B, the evaluation engine 418 may be configured to record various metrics and to produce a report 416 to the software update vendor on the actual time to update, report any update failures, and report on the configuration of the data processing system 100 at the completion of each successful software update implementation.

In an embodiment, the evaluation engine 418 may be configured to process the application SLT inputs 416 and update inputs 424 to as an output 428 an outage schedule 430. The outage schedule may set out a software update execution plan, including secondary software update targets and rules. The outage schedule 430 may produce an output 432 which is received as an input to a software update execution engine 434 configured to provide knowledge feedback 436 to the evaluation engine 418, including reports on actual software update completion times in the field, failure counts, etc.

In an embodiment, the feedback 436 of actual software update completion time results in a recalculation of remaining available outage time, and an ordering of pending software updates based on relative priorities and estimated execution and rollback times. Ordering and scheduling of software updates for installation within the remaining outrage time may continue until there is insufficient time remaining to schedule any of the remaining software updates.

As noted earlier, over time, the feedback 436 may allow system 400 to increase the accuracy of the estimates for execution and rollback of various software updates, based on expert knowledge gained over time. This may further improve the ability to schedule software updates within a scheduled outage time in a more efficient manner.

Figure 6:
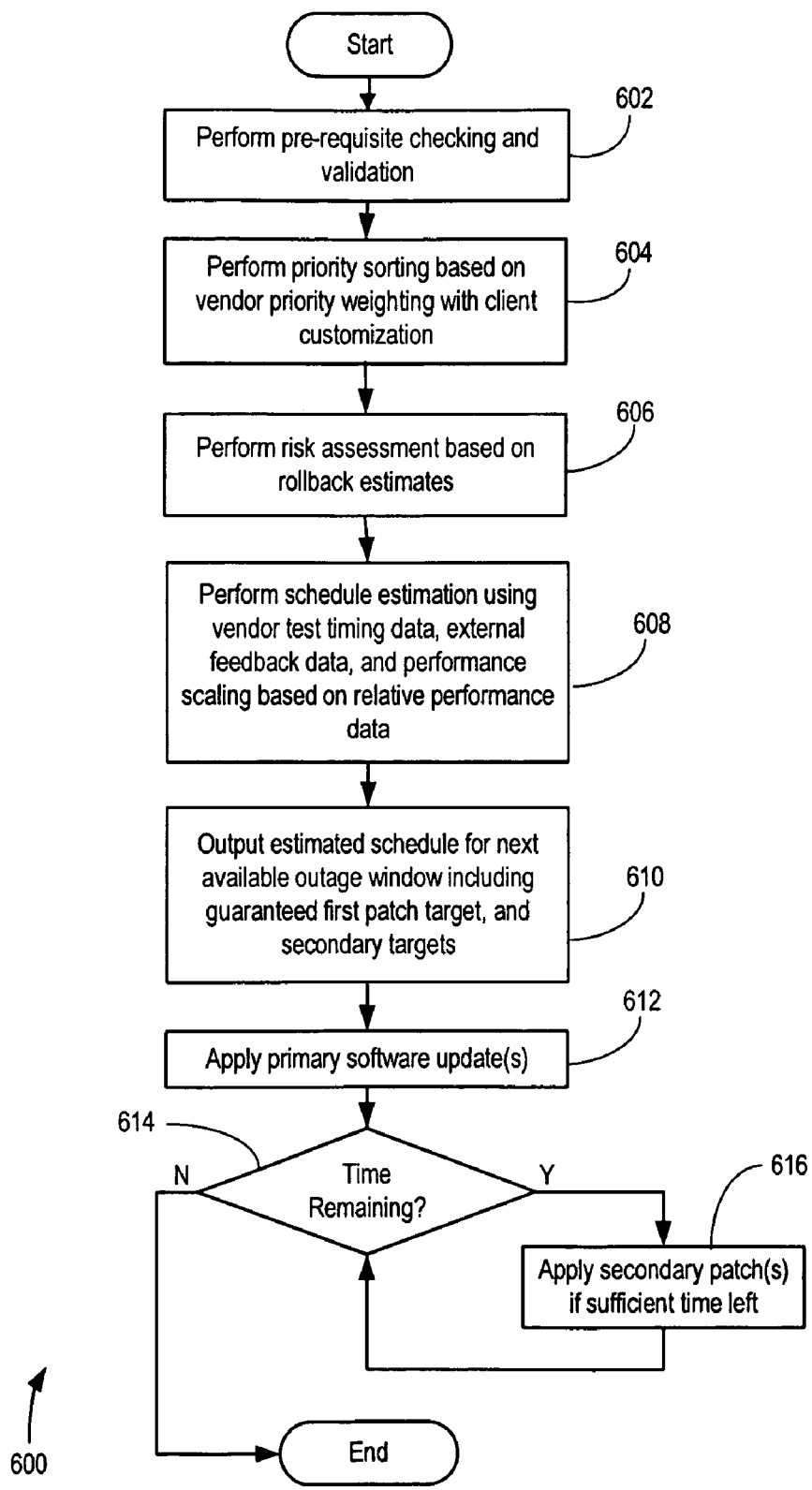
FIG. 6 shows a flowchart of an illustrative method in accordance with an embodiment.

Now referring to FIG. 6, shown is a flowchart of an illustrative method 600 for adaptive best-fit scheduling with added weighting for primary in accordance with an embodiment. As shown, method 600 begins and at block 602, performs prerequisite checking and validation. Method 600 them proceeds to block 604, where method 600 performs primary sorting of a list of required software updates based on vendor primary weighting with client customization. Method 600 then proceeds to block 606 to perform risk analysis for scheduling the software updates based on rollback estimates. Method 500 then proceeds to block 608, where method 600 performs scheduling using vendor test timing data (time to execute in lab environments), external feedback data (knowledgebase feedback through client execution attempts), and a performance scaling factor based on relative performance data (i.e.: as noted earlier, if the software update was tested on a system with x performance, and the target is a system with 2x performance scale the expected execution time appropriately).

Method 600 then proceeds to block 610, where method 600 outputs an estimated schedule for next available window including: i) guaranteed primary software update target (i.e. the primary software update fits inside window with minimal rollback risk); and ii) secondary targets (lower priority software updates that may fit within the window depending on actual execution time for primary target).

Method 600 then proceeds to block 612, where method 600 applies the software updates. Method 600 then proceeds to decision block 614, where method 600 determines if there is any time remaining in the outage window after completion of the primary target software update. If yes, method 600 proceeds to block 616, where method 600 schedule a secondary software update for execution if there is sufficient time remaining. At block 616, method 600 may order a list of available secondary software updates as described above given the outage time remaining, and considering an adequate safety factor as per vendor and client defined rollback specifications. Based on the evaluation, as earlier described, method 600 may schedule one or more software updates for scheduling and execution within the remaining outage time. Method 600 may loop at block 616 as long as there is still sufficient outage time remaining to schedule and execute one or more secondary software updates. Otherwise, method 600 ends.

As will be appreciated, the system and method described above may result in improved scheduling of software updates on data processing systems. This may help to ensure better audit compliance, provide a reduced operational risk, and provide a potential reduction in specially scheduled outages. This may also help to improve compliance with SLTs, and improve the efficient utilization of outage times, potentially resulting in reduced management costs.

The method and system may be particularly useful in complex IT environments including tiered applications or service levels as illustrated in FIG. 3, but could also be applied to a wide variety of environments requiring rule-based and feedback oriented management and scheduling of software updates.

While various illustrative embodiments of the invention have been described above, it will be appreciated by those skilled in the art that variations and modifications may be made. Thus, the scope of the invention is defined by the following claims.

What is claimed is:

1. A method of scheduling software updates for software on a data processing system, comprising:
   identifying a list of software updates;
   scheduling at least one primary software update for execution within a scheduled outage time based on an estimated execution time of the at least one primary software update, wherein the estimated execution time is determined based on actual execution times recorded from other data processing systems when performing the software update, and an estimated rollback time for the at least one primary software update to be rolled back to a previous state of the software prior to an execution of the at least one primary software update, wherein the estimated rollback time is part of a risk analysis for performing an automated rollback in an event of a failure;
   executing the at least one primary software update during the scheduled outage time; and
   ordering the list of software updates for possible execution of at least one secondary software update in any remaining outage time in dependence upon the estimated execution times and estimated rollback times for each of the remaining software updates.

2. The method of claim 1, further comprising ordering the list of software updates in dependence upon evaluation of relative priorities between the software updates, and any prerequisite software updates.

3. The method of claim 2, further comprising adjusting the estimated execution times and rollback times with an estimated performance scaling factor in dependence upon the type of data processing system.

4. The method of claim 3, further comprising recording metrics for executing the software updates and storing the metrics in a knowledge base, the recorded metrics including at least one of actual execution time, actual rollback time, and configuration information for the type of data processing system on which the software update was executed.

5. The method of claim 4, further comprising:
   evaluating the metrics stored in the knowledge base; and
   in dependence upon the evaluation, updating at least one of the estimated execution time, rollback time, and performance scaling factor for subsequent evaluation and ordering of the software updates.

6. A system for scheduling software updates for software on a data processing system by performing a method, the method comprising:

identifying a list of software updates;

scheduling, using a computing device, at least one primary software update for execution within a scheduled outage time based on an estimated execution time of the at least one primary software update, wherein the estimated execution time is determined based on actual execution times recorded from other data processing systems when performing the software update, and an estimated rollback time for the at least one primary software update to be rolled back to a previous state of the software prior to an execution of the at least one primary software update, wherein the estimated rollback time is part of a risk analysis for performing an automated rollback in an event of a failure;

executing the at least one primary software update during the scheduled outage time; and ordering the list of software updates for possible execution of at least one secondary software update in any remaining outage time in dependence upon the estimated execution times and estimated rollback times for each of the remaining software updates.

7. The system of claim 6, the method further comprising ordering the list of software updates in dependence upon evaluation of relative priorities between the software updates, and any prerequisite software updates.

8. The system of claim 7, the method further comprising adjusting the estimated execution times and rollback times with an estimated performance scaling factor in dependence upon the type of data processing system.

9. The system of claim 8, the method further comprising recording metrics for executing the software updates and storing the metrics in a knowledge base, the recorded metrics including at least one of actual execution time, actual rollback time, and configuration information for the type of data processing system on which the software update was executed.

10. The system of claim 9, the method further comprising:
evaluating the metrics stored in the knowledge base; and
updating at least one of the estimated execution time, rollback time, and performance scaling factor in dependence upon the evaluation, for subsequent evaluation and ordering of the software updates.

11. A non-transitory data processor readable medium storing data processor code that when loaded into data processing device adapts the device to schedule software updates for software, the data processor readable medium comprising code for:

identifying a list of software updates;

scheduling at least one primary software update for execution within a scheduled outage time based on an estimated execution time of the at least one primary software update, wherein the estimated execution time is determined based on actual execution times recorded from other data processing systems when performing the software update, and an estimated rollback time for the at least one primary software update to be rolled back to a previous state of the software prior to an execution of the at least one primary software update, wherein the estimated rollback time is part of a risk analysis for performing an automated rollback in an event of a failure;

executing the at least one primary software update during the scheduled outage time; and ordering the list of software updates for possible execution of at least one secondary software update in any remaining outage time, in dependence upon the estimated execution times and estimated rollback times for each of the remaining software updates.

12. The data processor readable medium of claim 11, further comprising code for ordering the list of software updates in dependence upon evaluation of relative priorities between the software updates, and any prerequisite software updates.

13. The data processor readable medium of claim 12, further comprising code for adjusting the estimated execution times and rollback times with an estimated performance scaling factor in dependence upon the type of data processing system.

14. The data processor readable medium of claim of claim 13, further comprising code for recording metrics for executing the software updates and storing the metrics in a knowledge base, the recorded metrics including at least one of actual execution time, actual rollback time, and configuration information for the type of data processing system on which the software update was executed.

15. The data processor readable medium of claim 14, further comprising code for:
evaluating the metrics stored in the knowledge base; and
modifying at least one of the estimated execution time, rollback time, and performance scaling factor in dependence upon the evaluation, for subsequent evaluation and ordering of the software updates.

* * * * *